United States Patent [19]
Butler

[11] Patent Number: 4,696,499
[45] Date of Patent: Sep. 29, 1987

[54] MECHANICAL PIPE JOINT AND METHOD OF FORMING THE SAME

[75] Inventor: Major G. Butler, Houston, Tex.

[73] Assignee: Butler Taper Joint, Houston, Tex.

[21] Appl. No.: 489,832

[22] Filed: Apr. 29, 1983

Related U.S. Application Data

[63] Continuation of Ser. No. 267,841, Jun. 5, 1981, abandoned, which is a continuation-in-part of Ser. No. 162,722, Jun. 25, 1980, abandoned.

[51] Int. Cl.⁴ .............................................. F16L 25/00
[52] U.S. Cl. .................................. 285/234.4; 285/915; 156/294
[58] Field of Search ...................... 285/332.4, 294, 297, 285/334.4, 915; 156/294

[56] References Cited

U.S. PATENT DOCUMENTS

| 2,795,440 | 6/1957 | Holycross et al. | 285/DIG. 16 |
| 2,825,587 | 3/1958 | Barta et al. | 285/DIG. 16 |
| 3,269,743 | 8/1966 | Barreca | 285/DIG. 16 |
| 3,567,257 | 3/1971 | Nowosadko | 285/334.4 X |
| 3,909,045 | 9/1975 | Meagher | 285/DIG. 16 |
| 4,095,825 | 6/1978 | Butler | 285/DIG. 16 |

FOREIGN PATENT DOCUMENTS

| 716468 | 8/1965 | Canada | 285/297 |
| 1085474 | 7/1960 | Fed. Rep. of Germany | 285/DIG. 16 |

Primary Examiner—Dave W. Arola
Attorney, Agent, or Firm—Vaden, Eickenroht, Thompson & Boulware

[57] ABSTRACT

A mechanical pipe joint is disclosed in which a pin formed on the end of one pipe section is inserted in a socket formed in the end of another pipe section. The tapered section on the pin has a taper angle less than the taper angle of the tapered section on the socket. When the pin is inserted to the desired depth, an annular cavity will be formed between the tapered section in which sealant is trapped to form an annular seal for the joint.

5 Claims, 6 Drawing Figures

MECHANICAL PIPE JOINT AND METHOD OF FORMING THE SAME

This is a continuation of Ser. No. 267,841, filed June 5, 1981, entitled "Mechanical Pipe Joint and Method of Forming the Same", now abandoned which is a continuation-in-part of Ser. No. 162,722, filed June 25, 1980, and entitled "Mechanical Pipe Joint and Method of Forming the Same", now abandoned.

This invention relates to a mechanical pipe joint and to a method of forming such joint.

In many applications, mechanical pipe joints have advantages over other conventional types of joints. They require no welder in the field and therefore a pipeline can be laid using this type joint with relatively inexpensive, unskilled workers. Also, no alignment clamps are required, as in the case of welded joints. Using this type of joint, instead of a threaded joint, eliminates the problem of thread protection, while moving the pipe to the field and stringing it along the right of way. A mechanical joint can be made up much faster than a threaded or welded joint in most cases. Such a joint is particularly advantageous for use with internally coated pipe because forming the joint will not damage the coating and any gap between the coating on the two members is filled with the sealant used to seal the joint.

Mechanical joints are formed by forcing a pin section on the end of one pipe section into a socket formed on the end of another pipe section. The socket includes a cylindrical section, which ususally has an inside diameter slightly less than the diameter of the pin to form an interference fit between the pin and cylindrical section of the socket when the joint is made. The interference fit provides structural strength to the joint.

The socket also includes a conical or tapered section between the cylindrical section and the pipe section. The socket is formed by inserting a mandrel of a predetermined size into the pipe to swage or bell the end of the pipe outwardly to form both the cylindrical section and the tapered section.

The pin section of the joint requires only the forming of a tapered section on the end of the pipe section.

In my previous patent, U.S. Pat. No. 4,095,825 entitled "Taper Pipe Joint", which issued on June 20, 1978, the tapered section of the socket and the tapered section of the pin were provided with diverging taper angles which resulted in an open-ended annular cavity being formed between the tapered sections when the pin was fully inserted into the socket sealant, was trapped in the annular cavity between the diverging tapers in the socket and pin, with which the pin was coated before insertion, when the joint was made up to form a seal in the cavity.

It is an object of this invention, however, to provide an improved mechanical joint and a method of forming such a joint in which the tapered sections on the socket and the pin, respectively, have converging taper angles that form a substantially closed annular cavity in which sealant is trapped to provide a seal for the joint.

It is another object of this invention to provide a mechanical pipe joint and a method of forming such a joint wherein the tapered sections on the socket and the pin converge to form a substantially closed annular cavity in which sealant can be trapped and compressed between the two tapers to seal the joint.

It is another object and feature of this invention to provide such a joint and method of forming the same wherein the annular body of sealant that seals the joint is protected from erosion by the fluids flowing through the joint.

It is a further object of this invention to provide such a joint in which the angle of taper on the pin is less than the angle of taper of the tapered section of the socket so that the end of the pin approaches or engages the tapered section of the socket the apex of the taper on the pin will not have reached the apex of the taper on the socket to form an annular cavity for the sealant that is closed or has a very narrow opening and which increases in cross section from the end of the pin to the apex of the socket to reduce to a minimum the sealant exposed to the erosive action of fluid flowing through the joint.

It is a further object of this invention to provide a mechanical pipe joint that is particularly advantageous for use with pipe that is coated internally with a coating that will crack if subjected to unnecessary externally applied hoop stresses.

These and other objects, advantages, and features of this invention will be apparent to those skilled in the art from a consideration of this specification, including the attached drawings and appended claims.

In the Drawings

Figure 1:
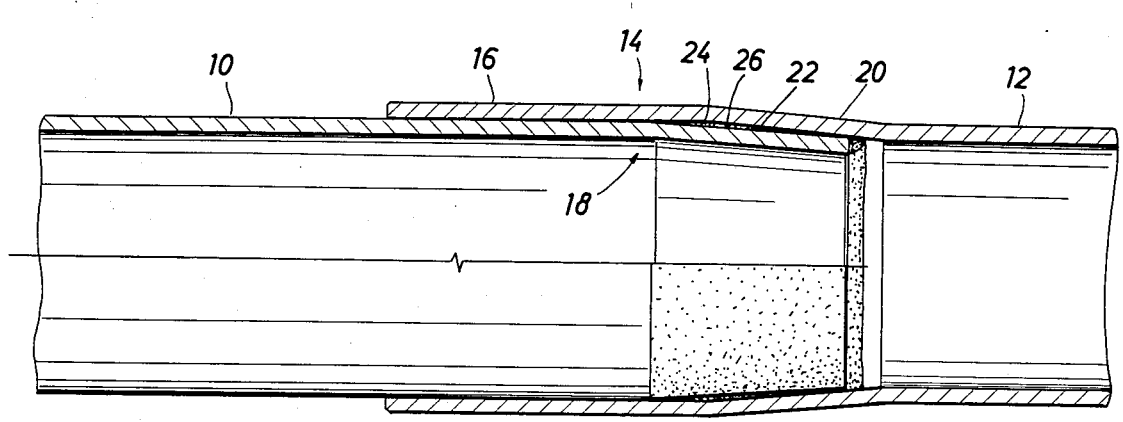
FIG. 1 is a view, partly in section and partly in elevation, of the joint of this invention.

In FIG. 1, pipe section 10 is connected to pipe section 12. The pipe sections have the same nominal diameter and wall thickness. The end of pipe section 12 is preformed into socket 14. The socket includes cylindrical section 16, which has an inside diameter slightly less than the outside diameter of pipe 10, about thirty to forty thousands of an inch (0.0762–0.1016 cm), so that when pin section 18, formed on the end of pipe 10, is inserted into the socket there will be an interference fit between the outside surface of pin section 18 and the inside surface of cylindrical section 16 of the socket. Tapered section 20 connects cylindrical section 16 of the socket to the rest of pipe section 12. The interference fit between cylindrical section 16 and the outside of the pin section provides the mechanical strength of the joint, i.e., its ability to withstand tensile and bending forces.

Figure 2:
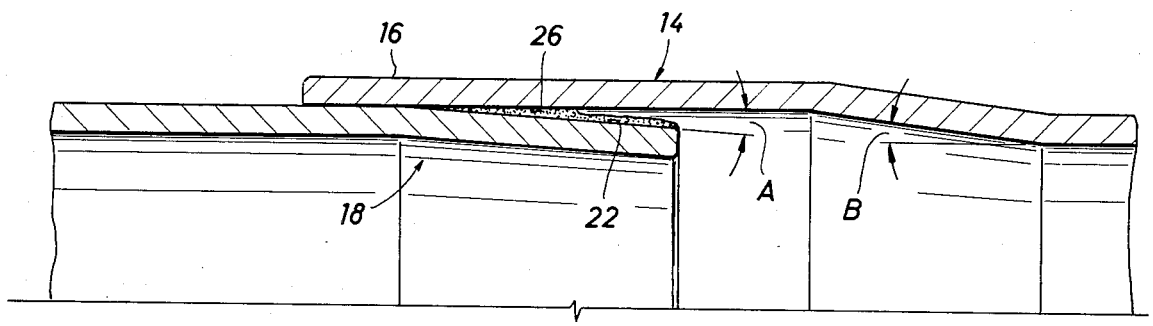
FIG. 2 is a sectional view on a larger scale through the upper half of the socket and pin sections of the joint of FIG. 1 with the pin partly inserted into the socket.

Pin section 18 includes tapered section 22, which has an angle of taper (angle A in FIG. 2) less than the taper angle of tapered section 20 on the socket (angle B in FIG. 2).

Figure 3:
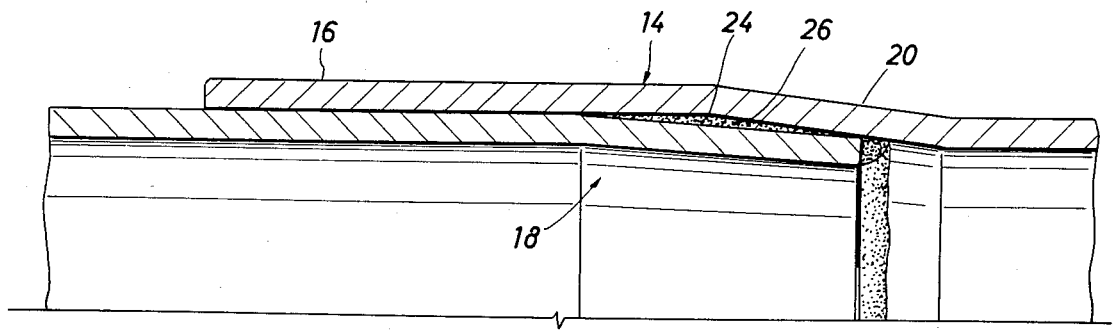
FIG. 3 is a sectional view of the joint of FIG. 2 after the pin has been completely inserted in the socket.

To make the joint, the tapered section of the pin is coated with sealant 26. The pin is then forced into the socket as shown in FIG. 2 until the end of tapered section 22 on the pin is close to or engages the inside surface of tapered section 20 on the socket. Due to the different angles of taper of tapered section 22 on the pin and tapered section 20 of the socket, the two tapered surfaces have tapers that converge inwardly and the end of the pin will engage the tapered surface 20 if the socket of the pin is inserted sufficiently. In FIG. 3, the pin is shown in engagement with surface 20 of the socket forming closed annular cavity 24 between the tapered surface 22 on the pin and portions of the tapered surface 20 on the socket and the inner surface of cylindrical section 16 of the socket. The cavity formed in this manner is triangular in cross section, being very narrow or coming to a point at the end of the pin with its widest section located between tapered surface 22 on the pin and the apex of tapered surface 20 on the socket. This results in a minimum of exposure of the sealant to the erosive action of the fluid flowing through the joint, which is one of the important features of this invention.

The sealant is extruded longitudinally from between the tapered sections, as the pin moves into engagement with the tapered section on the socket. A generous supply of sealant 26 should be applied to the tapered section of the pin to make sure that cavity 24 is filled with sealant when the pin is fully inserted. Any excess sealant will flow over the end of the pin as shown in FIGS. 1 and 3. This annular bead of sealant is exposed to the fluid flowing in the pipe, whereas, the sealant in cavity 24 is not and should remain in place indefinitely. The sealant trapped in annular cavity 24 provides a seal between the two surfaces and prevents fluid from leaking through the joints.

Most any substance that is soft enough to apply to the pin and which will fill the cavity and later harden can serve as a sealant. Preferably, a synthetic polymer is used that is semi-solid before application and which later becomes elastomeric.

Figure 4:
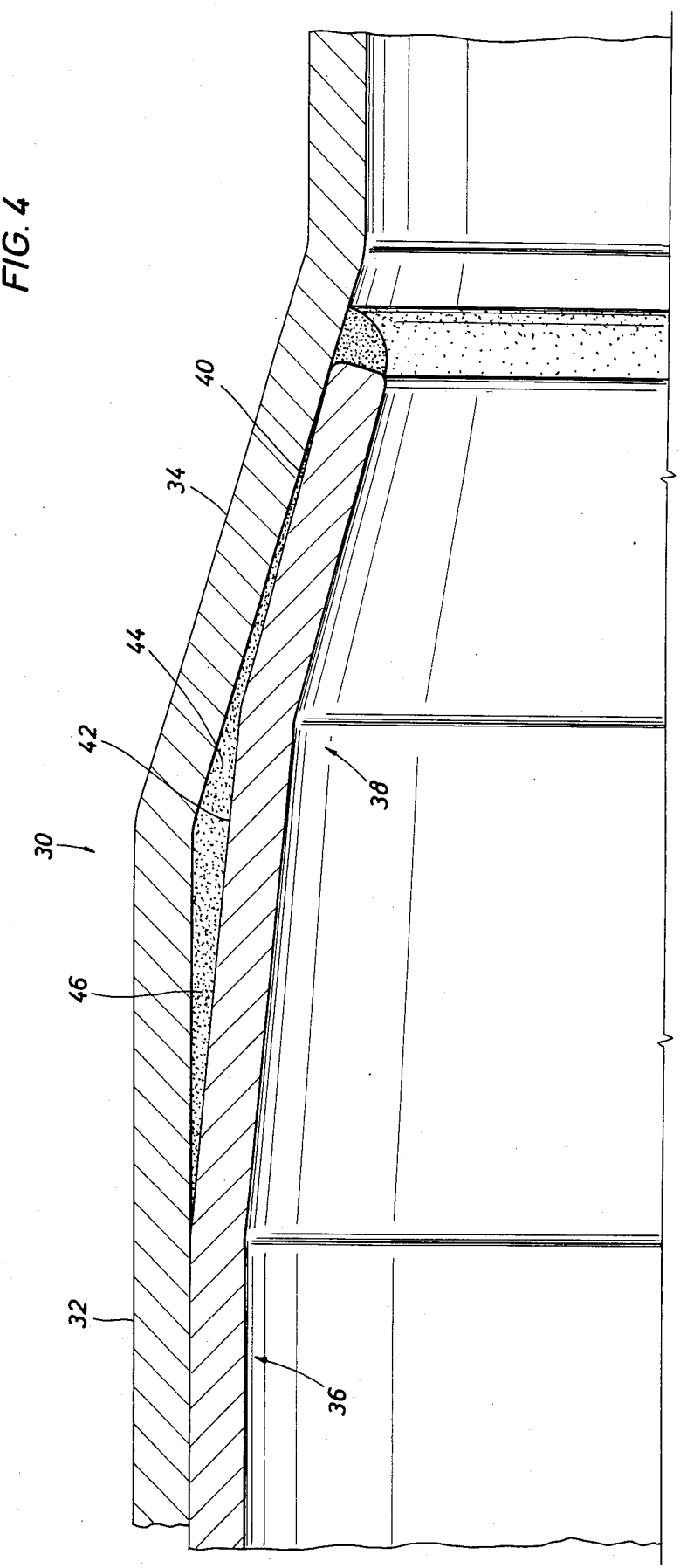
FIG. 4 is a sectional view on an enlarged scale of an alternate embodiment of the joint of this invention.

In the embodiment shown in FIG. 4, a slight change in the pin has been made. Socket 30, like socket 14 in the other embodiment, has cylindrical section 32 and tapered section 34. Pin section 36 has tapered section 38, which has two portions of different taper angles. First portion 40 has a slightly greater taper angle than portion 42. With the double taper, when the pin has reached the position shown in FIG. 4, additional force may be applied urging the pin farther into the socket. This will cause a slight bending of the first tapered portion 40 relative to tapered portion 42 because of the additional movement of the pin into the socket. As a result, the volume of annular cavity 44 in which sealant 46 is trapped will decrease. This will result in a further compressing of the sealant in the annular cavity and will insure that the cavity is full of sealant.

This same thing happens with the single tapered pin of FIGS. 1-3. The double taper just adds a second flexure joint.

This additional movement of the pin into the socket is very slight. Usually, the operator will place a mark on the pin a known distance from the end of the pin so he will know when the pin has been fully inserted and the pin has engaged the tapered section of the socket. He may want to stop there or he can apply more force to slightly decrease the volume of the annular cavity and obtain the advantage described above.

Figure 5:
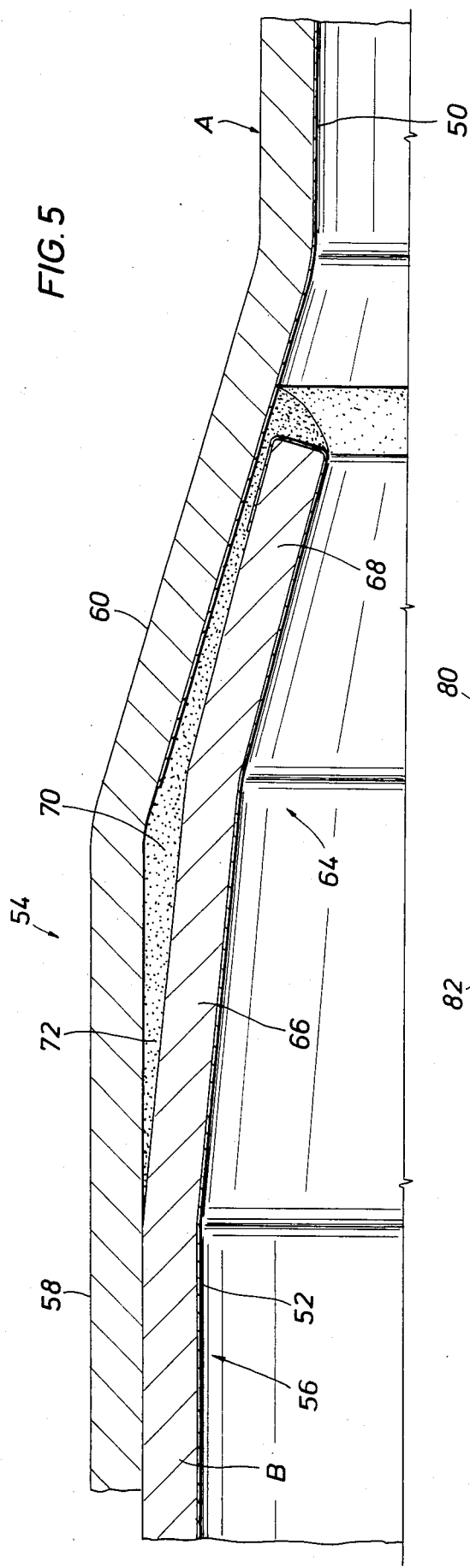
FIG. 5 is a cross sectional view similar to FIG. 4 of the joint of this invention as it is used with internally coated pipe.

The joints shown in FIGS. 1-4 and described above are made using uncoated pipe and, preferably, the end of the pin engages the tapered section of the socket although a completely satisfactory joint having all of the advantages of the substantially closed annular cavity for the sealant can be obtained even if the end of the pin joint comes close to engaging the tapered surface of the socket. This is what is done when joining internally coated pipe as shown in FIG. 5.

This joint is basically the same as the joint of FIG. 4 except that the inside surface of pipe sections A and B are coated with coatings 50 and 52, respectively. The ends of the pipe are preformed into socket 54 and pin 56 before the coating is applied. The socket includes cylindrical section 58 and tapered section 60, which preferably has a taper angle of about 6°. The pin includes cylindrical section 62 and inwardly tapered section 64 comprising sections 66 and 68 having slightly different taper angles. Tapered sections 66 and 68 preferably have taper angles of about 3° and 4° respectively. The pipe sections are then coated internally. Coating 50 on pipe section A extends into the socket far enough to cover most of the inner surface of tapered section 60. The coating on pipe section B extends over the inner surface of the pin including the tapered section, over the end of the pin, and back a short distance over the outer surface of the tapered section. Then when the joint is made up, as shown in FIG. 5, the narrow gap between the coated end of the pin and the coated surface on the tapered surface of the socket is filled with sealant 70 and the metal of the pipe sections is effectively protected from the corrosive fluids flowing through the joint.

Where the pipe is coated, the end of the pin cannot be moved into engagement with the tapered surface on the socket because it may cause the coating at that joint to crack and the cracks may extend beyond the protection of the sealant. Therefore, the pin is brought close to but spaced from the tapered surface of the socket to create annular cavity 72 that has a very narrow opening into the inside of the joint. This stand off should be about 1/32-1/16 of an inch. With such a narrow gap, the sealant can effectively close the cavity and protect the sealant from erosion by the fluids flowing through the joint. Annular bead 74 of sealant also helps insure that the sealant between the pin and the socket remains intact.

The interference fit between the cylindrical sections of the pin and socket will vary due to variations in the wall thickness of the pin. When joining coated pipe, particularly if the coating is hard and somewhat brittle, the hoop stress imposed on the pin due to the interference fit when the pipe is oversize will cause sufficient strain in the cylindrical section of the pipe to crack the coating.

Figure 6:
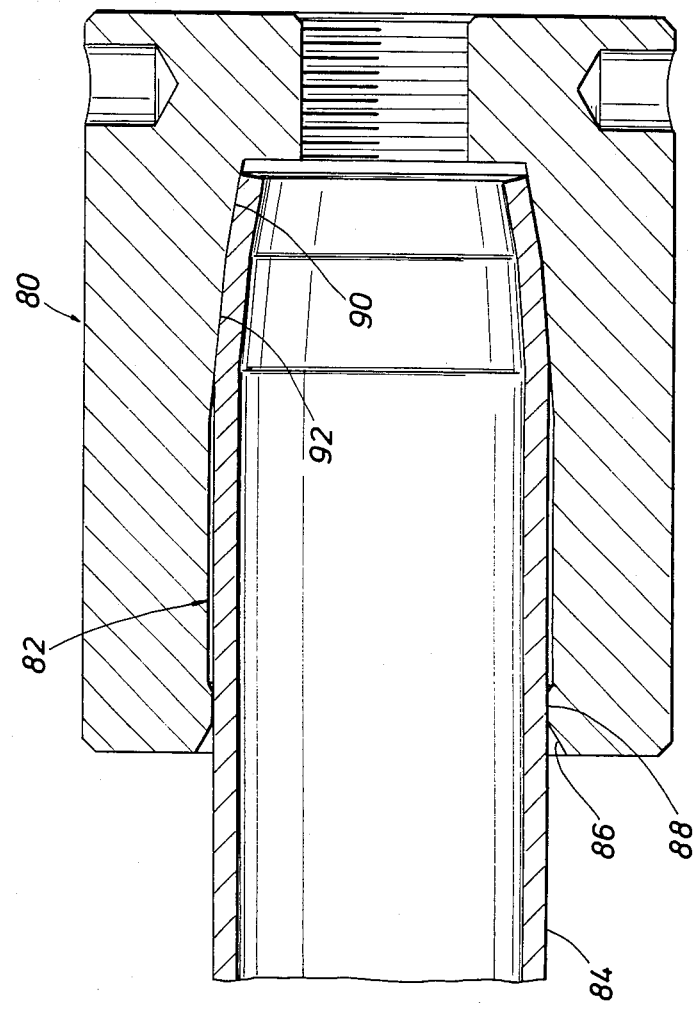
FIG. 6 is a cross sectional view of the mandrel used to size the outside diameter of the pin to ensure the proper interference fit and to also form the tapers on the end of the pipe.

To prevent this, it is one of the features of this invention to size the outside diameter of the pin to closely control the interference fit between it and the socket. In FIG. 6, mandrel 80 is designed to form tapered section 64 on the pin and to size the outside diameter of the cylindrical section of the pin. The mandrel is cylindrically shaped. Central opening 82 is to form the end of pipe section 84 to the desired shape. The outer end of opening 82 had a lead-in taper 86 which guides the pipe entering the mandrel to cylindrical section 88. This diameter of section 88 is such that as the end of pipe 84 is forced into the mandrel to the position shown, the outside diameter will be reduced, if the pipe is oversize, to a preselected diameter that will not cause sufficient strain in the pipe when forced into a socket on another pipe to crack the inner coating on the pipe.

Opening 82 has tapered wall sections 90 and 92 against its inner end which form double tapered section 64 on the pin. Between the tapered wall sections and pipe sizing section 88, the diameter of opening 82 is greater than the diameter of the pipe being formed.

From the foregoing it will be seen that this invention is one well adapted to attain all of the ends and objects hereinabove set forth, together with other advantages which are obvious and which are inherent to the apparatus and method.

It will be understood that certain features and subcominations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A mechanical pipe joint for connecting two pipe sections, comprising a pin on the end of one section and a socket on the end of the other section into which the pin is inserted, said socket including a cylindrical section having an inside diameter less than the outside diameter of the pin to form an interference fit with the pin when the pin is inserted into the socket and an outwardly extending tapered section connecting the cylindrical section to the pipe section, said pin including an inwardly tapered section having an angle of taper less than the angle of taper of the tapered section of the socket to form a substantially closed annular cavity between the tapered section of the socket and a portion of the cylindrical section of the socket in which sealant may be trapped to seal the joint when the tapered section of the pin is moved into position close to the tapered section of the socket.

2. The joint of claim 1 in which the tapered section on the pin has first and second tapered portions of different taper angles with the first tapered portion having a greater taper angle than the second and with the taper angle of each portion being less than the taper angle of the tapered section on the socket.

3. A pipe for connecting two pipes to form a pipeline for conducting fluids, slurries, and the like, said pipe having a socket formed on one end and a pin formed on the other end, said socket comprising a cylindrical section having an inside diameter slightly less than the outside diameter of the pin and an outwardly extending tapered section connecting the cylindrical section to the pipe, said pin comprising an inwardly tapered section on the end of the pipe, having a taper angle less than the taper angle of the tapered section of the socket.

4. A method of making a pin and socket type of mechanical pipe joint between a first and a second pipe comprising the steps of forming a socket in one end of the first pipe having a cylindrical section and a tapered section extending outwardly from the pipe to connect the cylindrical section to the pipe with the inner diameter of the cylindrical section being slightly smaller than the outer diameter of the second pipe, forming a pin at one end of the second pipe having an inwardly tapering section the taper angle of which is less than the taper angle of the tapered section of the socket, coating the tapered section of the pin with a sealant, and forcing the pin into the socket until the end of the tapered section on the end of the pin is positioned close to the tapered section of the socket to form a substantially closed, annular cavity between the two tapered sections on the pin and positions of the tapered section and the cylindrical section of the socket in which the sealant is trapped and a mechanical interference fit between the cylindrical section of the socket and the pin.

5. A method of making a pin and socket type of mechanical pipe joint between a first and a second pipe, comprising the steps of forming a socket in one end of the first pipe having a cylindrical section and a tapered section extending outwardly from the pipe to connect the cylindrical section to the pipe with the inner diameter of the cylindrical section being slightly smaller than the outer diameter of the second pipe, sizing the outside diameter of the second pipe adjacent one end to obtain a predetermined interference fit between the second pipe and the cylindrical section of the socket in the end of the first pipe, forming a pin at one end of the second pipe having an inwardly tapering section the taper angle of which is less than the taper angle of the tapered section of the socket, coating the tapered section of the pin with a sealant, and forcing the pin into the socket until the end of the tapered section on the end of the pin is positioned close to the tapered section of the socket to form a substantially closed annular cavity between the two tapered sections and between the tapered section on the pin and a portion of the cylindrical section of the socket in which the sealant is trapped and a mechanical interference fit between the cylindrical section of the socket and the pin.

* * * * *